United States Patent
Boshernitsan et al.

(10) Patent No.: US 9,612,943 B2
(45) Date of Patent: Apr. 4, 2017

(54) PRIORITIZATION OF TESTS OF COMPUTER PROGRAM CODE

(71) Applicant: Synopsys, Inc., Mountain View, CA (US)

(72) Inventors: Marat Boshernitsan, San Francisco, CA (US); Andreas Kuehlmann, Berkeley, CA (US)

(73) Assignee: Synopsys, Inc., Mountain View, CA (US)

( * ) Notice: Subject to any disclaimer, the term of this patent is extended or adjusted under 35 U.S.C. 154(b) by 284 days.

(21) Appl. No.: 14/037,540

(22) Filed: Sep. 26, 2013

(65) Prior Publication Data

US 2015/0007140 A1  Jan. 1, 2015

Related U.S. Application Data

(60) Provisional application No. 61/840,513, filed on Jun. 28, 2013, provisional application No. 61/840,526, filed on Jun. 28, 2013.

(51) Int. Cl.
*G06F 9/44* (2006.01)
*G06F 11/36* (2006.01)

(52) U.S. Cl.
CPC ........ *G06F 11/368* (2013.01); *G06F 11/3688* (2013.01)

(58) Field of Classification Search
CPC ........................... G06F 11/3688; G06F 11/368
(Continued)

(56) References Cited

U.S. PATENT DOCUMENTS 5,335,344 A    8/1994  Hastings
7,340,726 B1 *  3/2008  Chelf et al. ................... 717/126
(Continued)

FOREIGN PATENT DOCUMENTS

GB          2460407 A    12/2009
WO    WO-2008/074529 A2   6/2008

OTHER PUBLICATIONS

Aggrawal et al., Code Coverage Based Technique for Prioritizing Test Cases for Regression Testing, ACM SIGSOFT Software Engineering Notes, 29(5) (Sep. 2004), Applicant Provided Prior Art.*
(Continued)

*Primary Examiner* — Lewis A Bullock, Jr.
*Assistant Examiner* — Theodore Hebert
(74) *Attorney, Agent, or Firm* — HIPLegal LLP; Judith Szepesi

(57) ABSTRACT

A method is provided to prioritize testing of computer program code comprising: determining first test coverages of items within a first source code version for multiple tests; storing in a non-transitory storage device, a first history that indicates the determined first test coverages of the items within the first source code version; identifying occurrences of the items within a second source code version; determining first weights associated with tests, wherein a respective weight associated with a respective test is indicative of a respective number of respective items within the second source code version that are covered by the respective associated test according to the first history; and prioritizing the multiple respective tests based at least in part upon the determined first weights.

21 Claims, 6 Drawing Sheets

(58) Field of Classification Search
USPC .......................................................... 717/124
See application file for complete search history.

(56) References Cited

U.S. PATENT DOCUMENTS

| | | | |
|---|---|---|---|
| 2003/0204836 A1* | 10/2003 | Srivastava et al. | 717/124 |
| 2003/0212924 A1* | 11/2003 | Avvari et al. | 714/38 |
| 2005/0081106 A1* | 4/2005 | Chang et al. | 714/38 |
| 2008/0120601 A1* | 5/2008 | Ashida et al. | 717/124 |
| 2009/0259610 A1* | 10/2009 | Morizawa et al. | 706/46 |
| 2014/0130020 A1* | 5/2014 | Boshernitsan et al. | 717/131 |
| 2015/0007140 A1* | 1/2015 | Boshernitsan et al. | 717/124 |

OTHER PUBLICATIONS

"International Application Serial No. PCT/US2014/044127, International Search Report mailed Oct. 29, 2014", 4 pgs.
"International Application Serial No. PCT/US2014/044127, Written Opinion mailed Oct. 29, 2014", 6 pgs.
Aggrawal, K. K, et al., "Code Coverage Based Technique for Prioritizing Test Cases for Regression Testing", *ACM SIGSOFT Software Engineering Notes*, 29(5), (Sep. 2004), 1-4.
Srivastava, Amitabh, et al., "Effectively Prioritizing Tests in Development Environment", *ACM SIGSOFT Software Engineering Notes*, 27(4), (2002), 97-106.

\* cited by examiner

```
int f1 (int *x) {
    return *x;
}
int f2 (int *x) {
    return *x + 1;
}
int f3 (int *x) {
    return *x + 2;
}
int
main(int argc, char **argv)
{
    int p = 1;
    if (!strcmp (argv [1] , "1")) {
        f2 (&p) ;
        f3 (&p) ;
    }
    if (!strcmp (argv [1] , "2")) {
        f1 (&p) ;
        f3 (&p) ;
    }
    if (!strcmp (argv [1] , "3")) {
        f3 (&p) ;
    }
}
```

```
int f1 (int *x) {
// CHANGE START
    if (!x) {
        return 0;
    }
// CHANGE END
    return *x;
}
int f2 (int *x) {
    return *x + 1;
}
int f3 (int *x) {
// CHANGE START
    if (!x) {
        return 0;
    }
// CHANGE END
    return *x + 2;
}
int
main(int argc, char **argv)
{
    int p = 1;
    if (!strcmp (argv [1] , "1")) {
        f2 (&p) ;
        f3 (&p) ;
    }
    if (!strcmp (argv [1] , "2")) {
        f1 (&p) ;
        f3 (&p) ;
    }
    if (!strcmp (argv [1] , "3")) {
        f3 (&p) ;
    }
}
```

*FIG. 6*

PRIORITIZATION OF TESTS OF COMPUTER PROGRAM CODE

RELATED APPLICATIONS

This application claims the benefit of priority to U.S. Provisional Patent Application Ser. No. 61/840,513, filed Jun. 28, 2013 and U.S. Provisional Patent Application Ser. No. 61/840,526, filed Jun. 28, 2013, which are hereby incorporated by reference herein in their entirety.

BACKGROUND

Dynamic analysis and static analysis are two different techniques used in the automated testing of software code. Dynamic analysis is performed by observing the behavior of code while the code executes on a machine. Static analysis is performed on static code i.e., code that is not running during the analysis process.

Dynamic analysis evaluates runtime behavior of computer code. Instrumentation code is inserted into the code-under-test. The instrumentation code captures runtime information generated in the course of execution of the code for use in observing and evaluating the dynamic, i.e. runtime execution, behavior of the code. U.S. Pat. No. 5,335,344, invented by Hastings, discloses an example of some known software code instrumentation and dynamic analysis techniques. The execution of code during dynamic analysis is driven by tests, which are artifacts that provide input parameters to the system undergoing the analysis. Additionally, tests verify the intended behavior by comparing the output from the system under test with the expected output recorded as part of each test case.

Static analysis can be used to detect kinds of errors that are often missed when using dynamic analysis techniques alone. For example, static analysis may detect an illegal operation that is contained in a rarely traversed or otherwise hard-to-test conditional branch code path that is rarely visited during operation of the software, and that therefore, easily could go undetected during dynamic analysis. Static analysis ordinarily involves use of a variety of different static analysis programs/software tools often referred to as 'checkers' to evaluate code paths to identify different kinds of vulnerabilities and/or errors. For example, checkers can be used to detect syntax errors, functions without return values, variables that have been declared but not used, inadvisable automatic type conversions, tainted data, integer overflows, global-variable inconsistencies, problems associated with using modules (e.g., missing or invalid modules or input/export mismatches), to name just a few.

Dynamic analysis and static analysis techniques have been developed that utilize information generated during a build process to identify the code that is to be subjected to analysis. Modern software typically is developed using a modular approach. Teams of programmers may work on different modules or portions of the software. Consequently, source code, compilers, and ancillary software components often are distributed across many different directories and systems. As a result of this complexity, software developers typically use build management utilities such as the "make" program to assist in the process of building executable code.

Dynamic analysis and static analysis can take advantage of the build process by intercepting information about the code generated during a build process and using the information to identify the code to be analyzed. During a typical software development process, source code is compiled to produce an executable script in a high-level programming language, byte code that needs to be further interpreted by an interpreted program, and/or executable binary code that runs directly on the CPU. Different portions of the software may be written using different programming languages that require the use of different compilers, for example. Moreover, different compilers may be used to compile different portions of the source code, even when all of the code is written in the same language. For example, different compilers may produce executable code that runs on computer systems with different microprocessors. A 'build' process, which involves identifying the source code files associated with a program and establishing appropriate directory locations, compiler names, and other compilation settings involves many steps, and software developers typically automate such a build process using what typically is referred to as a build program. Both dynamic analysis and static analysis processes may leverage information about source code that is made available during the build process by intercepting information that identifies the code to be statically analyzed. Commonly owned U.S. Pat. No. 7,340,726 invented by Chelf et al. describes examples of some known static analysis techniques that leverage information about code made available during a build process.

Dynamic analysis can require a large amount of computing resources and can be time consuming. During a software development process, there may not be adequate computing resources or adequate time to run all possible tests. Therefore, there is a need to prioritize the tests such that higher priority tests run before lower priority tests.

SUMMARY

In one aspect, a method is provided to prioritize testing of computer program code. First test coverages are determined for respective items within a first source code version for multiple respective tests. A first history that indicates the determined first test coverages is stored in a storage device. Occurrences of the respective items within a second source code version are identified. First weights associated with respective tests are determined. A respective weight associated with a respective test is indicative of a number of items within the second source code version that are covered by the associated test according to the first history. The multiple tests are prioritized based at least in part upon the determined first weights. In another aspect, a method is provided to prioritize testing of computer program code. First test coverages are determined for respective items within a first source code version for multiple respective tests. A first history that indicates the determined respective first test coverages of the respective items within the first source code version is stored in a storage device. One or more respective entities are identified within a second source code version. Occurrences of the respective items associated with the one or more respective entities are identified within the second source code version. Weights associated with respective tests are determined. A respective weight associated with a respective test is indicative of a number of items identified as being associated with the one or more entities within the second source code version that are covered by the associated test according to the first history. The multiple respective tests are prioritized based at least in part upon the determined first weights

BRIEF DESCRIPTION OF THE DRAWINGS

FIG. 6 is an illustrative drawing that shows example changed computer program code that is stored in a non-transitory computer readable storage device and that is executed during a partial run in accordance with some embodiments.

DESCRIPTION OF EMBODIMENTS

Figure 1:
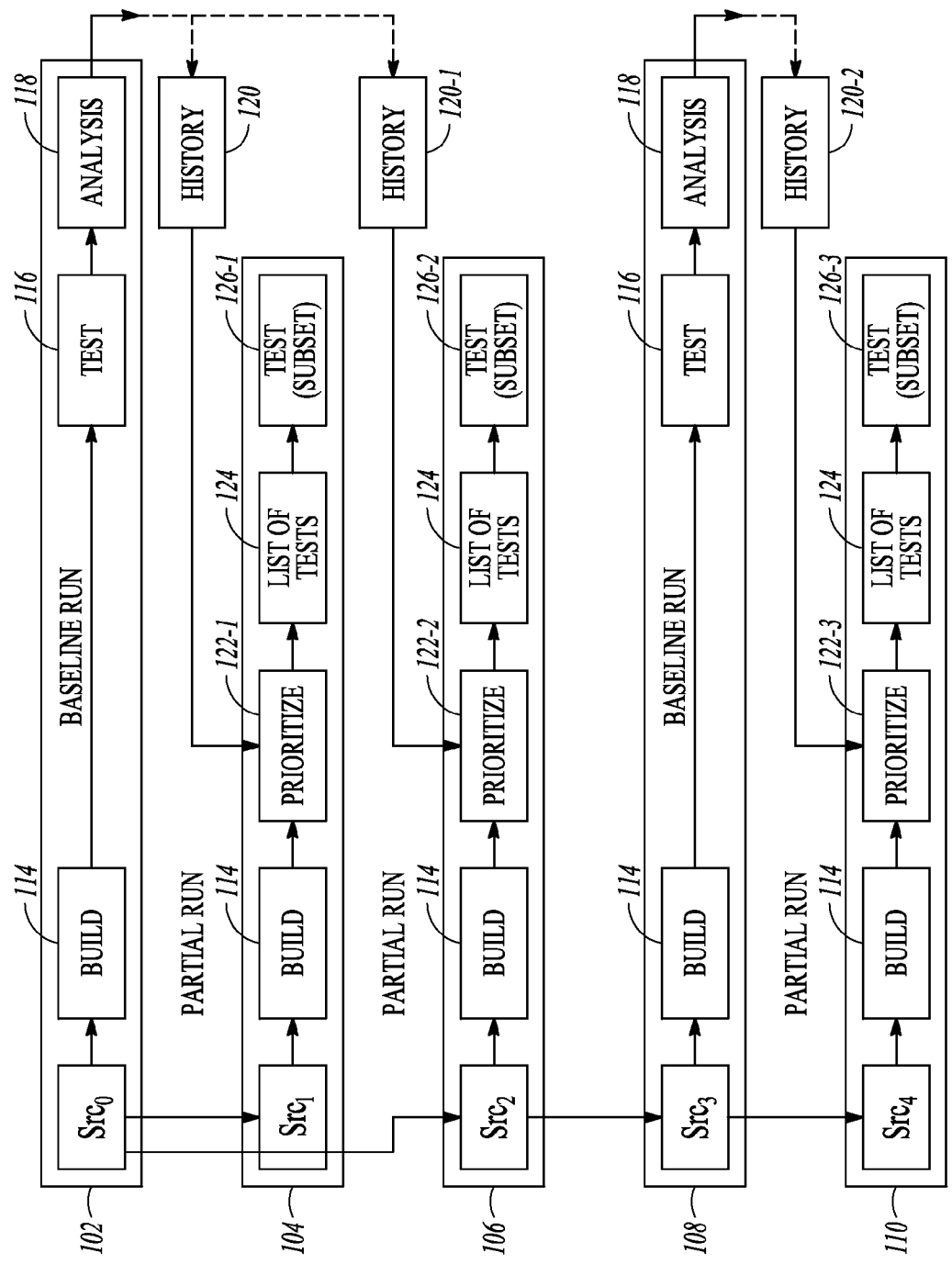
FIG. 1 is an illustrative drawing representing process flow involved with baseline runs and partial runs in accordance with some embodiments.

The following description is presented to enable any person skilled in the art to create and use a computer system configuration and related method and article of manufacture to prioritize tests used to determine correctness of computer program code. In some embodiments, a test of program code may be used to identify defects or vulnerabilities in the code, for example. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

Overview

As used herein the term "run" refers to invocation of tests and/or analysis on a particular version of a source code base and may involve processes required to extract information from the source code that is necessary for the analysis. Baseline runs involve dynamic tests and static code analysis to develop baseline test metrics. Partial runs involve performance of static code analysis of changed code. Partial runs also involve performance of test prioritization based upon factors that include, which functions and/or files are contained in the changed code, user-defined test policy filters and the baseline test metrics. Following the partial run, actual dynamic tests of the changed code may be run in accordance with the determined test prioritization.

More specifically, during a baseline run, dynamic tests are performed to ascertain test coverage metrics for functions and/or files within a baseline code version for each of multiple tests. In other words, during a baseline run, relationships are established between tests and functions and/or files. Later, during a later partial run, static analysis is used to identify the functions and/or files contained within the changed code. It will be appreciated that the code changes may result in addition or removal of functions and/or files subsequent to the baseline run. Also during a partial run, further determinations are made as to which tests provide optimal coverage in view of the coverage determinations made in the baseline run and in view of the functions and/or files identified as being contained within the changed code. Optionally, during a partial run, static analysis may be used to apply user-defined code filters to functions and/or files contained within the changed code. The code filters can be used to impart user-defined test prioritization policies to the determinations as to which tests provide optimal coverage in view of the coverage determinations made in the baseline run and in view of the functions and/or files identified as being contained within the changed code. The coverage determinations made during a partial run are used to prioritize tests to be applied to the changed code.

Also, during a baseline run, static analysis is performed to determine property metrics of functions contained within the baseline code version. In particular, selected property evaluations are performed to determine properties of functions within the baseline code version, and the determined properties are stored. During a subsequent partial run, the same selected property evaluations are performed to determine properties of functions contained within the changed code version. The stored properties determined for functions contained in the baseline code version are compared with the properties determined for functions contained in the changed code version so as to identify functions having changed properties. Identified function property changes are used to prioritize tests. Specifically, tests may be prioritized so as to more highly prioritize tests of that cover functions with changed properties.

After completion of test prioritization during a partial run, actual dynamic tests may be run on the changed code in accordance with the determined test prioritization.

Process Flow

FIG. 1 is an illustrative drawing representing process flow involved with baseline runs and partial runs in accordance with some embodiments. A first baseline run 102 involves source code version $Src_0$. A first partial run 104 involves source code version $Src_1$, which is changed relative to version $Src_0$. A second partial run 106 involves source code version $Src_2$, which also is changed relative to version $Src_0$. A second baseline run 108 involves source code version $Src_3$. A third partial run 110 involves source code version $Src_0$, which is changed relative to version $Src_3$. It will be appreciated that each of the software versions is stored in a non-transitory storage device.

During the first baseline run 102, a build process 114 builds the $Src_0$ code version, which may include code obtained from different locations, for example. A dynamic test process 116 runs multiple tests on the Src0 code. Analysis process 118 determines test metrics. The determined test metrics may include structural information such as coverage metrics and non-structural information such as properties of functions within $Src_0$, duration of the individual tests, date of the test, whether the code passes or fails individual tests and an update of historical failure rates for individual tests. The test metrics are stored as a first baseline history 120-1.

During the first partial run 104, the build process 114 builds the $Src_1$ code version, which may include code obtained from different locations, for example. A first prioritization process 122-1 examines the $Src_1$ code to determine functions and/or files contained within it and apply user-defined rules to further analyze the $Src_1$ code in view of the test metrics in the first baseline history 120-1 and to determine a prioritization among tests. The first prioritization process 122-1 applies the determined prioritization to a list of tests 124 so as to produce a first prioritized subset of tests 126-1. The first prioritized subset of tests 126-1 may include all tests in a prioritized order or may include only certain tests that have been selected to be performed. As used herein, priority refers to the execution priority of tests.

Following the first partial run, an actual first subset of prioritized tests may be run (process not shown) in which tests with a higher execution priority execute before tests with a lower execution priority. If the time for running the tests is limited, then lower priority tests might not run due to the time limitation, for example.

During the second partial run 106, the build process 114 builds the $Src_2$ code version. A second prioritization process 122-2 examines the $Src_2$ code to determine functions and/or files contained within it and apply user-defined rules to further analyze the $Src_2$ code in view of the test metrics in the first baseline history 120-1 and to determine a prioritization among tests. The second prioritization process 122-2 applies the determined prioritization to the list of tests 124 so as to produce a second prioritized subset of tests 126-2.

It will be appreciated that the first and second prioritization processes 122-1, 122-2, may differ due to differences in the $Src_1$ and $Src_2$ code versions and/or due to differences in the user-defined rules, for example. Differences in the prioritization processes, in turn may result in differences between the first and second prioritized subset of tests 126-1, 126-2. It is noted that although the lists of tests 124 is shown as being the same in the first and second partial runs, the tests may differ, and that difference also could contribute to differences in test prioritizations as between the first two partial runs.

Following the second partial run, the actual second subset of prioritized tests may be run (process not shown) in which tests with a higher execution priority execute before tests with a lower execution priority. Once again, if the time for running the tests is limited, then lower priority tests might not run due to the time limitation, for example.

During the second baseline run 108, the build process 114 builds the $Src_3$ code version. The dynamic test process 116 runs multiple tests on the Src3 code. The dynamic tests run during the second baseline run 108 may or may not be the same as the tests run during the first baseline run 102. The analyses process 118 determines test metrics, which are stored as a second baseline history 120-2.

It will be understood that one reason to perform another baseline run is that as the code base evolves, the differences between the baseline code version and partial run code versions can become greater and greater. As a result, test metrics developed during a baseline run such as test coverage, for example, can diverge more and more with each successive partial run version. Accordingly, new baseline runs are performed periodically to bring the test metrics up to date with the actual source code version.

During the third partial run 110, the build process 114 builds the $Src_4$ code version. A third prioritization process 122-3 examines the $Src_4$ code to determine functions and/or files contained within it and apply user-defined rules to further analyze the $Src_4$ code in view of the test metrics in the second baseline history 120-2 and to determine a prioritization among tests. The third prioritization process 122-3 applies the determined prioritization to the list of tests 124 so as to produce a third prioritized subset of tests 126-3.

Following the third partial run, the actual third subset of prioritized tests may be run (process not shown) in which tests with a higher execution priority execute before tests with a lower execution priority. As explained above, if the time for running the tests is limited, then lower priority tests might not run due to the time limitation, for example.

Tests

Figure 2:
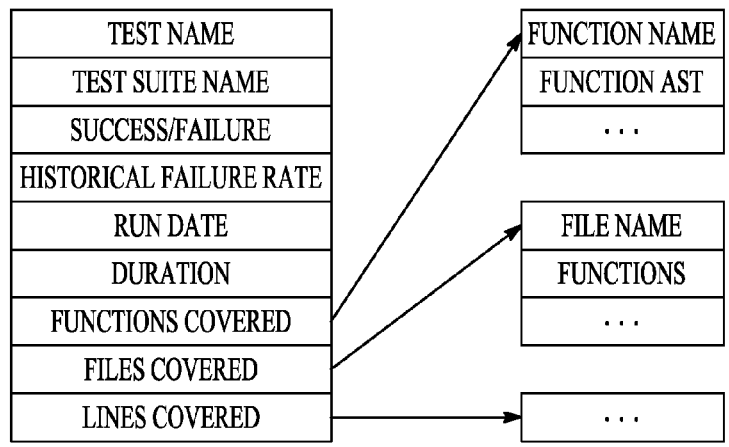
FIG. 2 is an illustrative drawing representing attributes of a typical test in accordance with some embodiments.

FIG. 2 is an illustrative drawing representing a dynamic test information data structure to store test information in a non-transitory computer readable storage device in accordance with some embodiments. Each dynamic test is associated with a test information data structure that provides information about the test. Test name and test suite information can be used to identify the test. Each time a dynamic test is run, non-structural information can be gathered such as success/failure (i.e., whether or not actual results matched expected results), run date and test duration and to updated the historical failure rate. In addition, when a test is run, structural information can be gathered such as functions covered by test, files covered by test and lines covered by the test. As indicated in the drawing, functions are associated in storage with function names, which in turn, are associated with function ASTs. Furthermore, files are associated with file names, which in turn, are associated with functions contained within the file.

The term 'structural information' as used herein refers to information concerning the execution path of a computer program under test. An execution path is defined in terms of functions executed and/or in terms of files invoked in the course of a test run. The term 'test' as used herein refers to a computer program together with inputs to the program. The combination of a computer program and inputs to the program defines a test. Changing the inputs to the program changes the test. Different inputs to the same program define different tests.

Different inputs to the same program result in the program following different execution paths. The term 'test coverage' as used herein refers to the group of functions exercised and/or group of files invoked in the course of execution of a program. In general, a determination of whether a test passes or fails depends upon whether test produces expected results, for example. Thus, results produced by a test may be compared with expected results to determine whether the test passes or fails.

System Overview

Figure 3A:
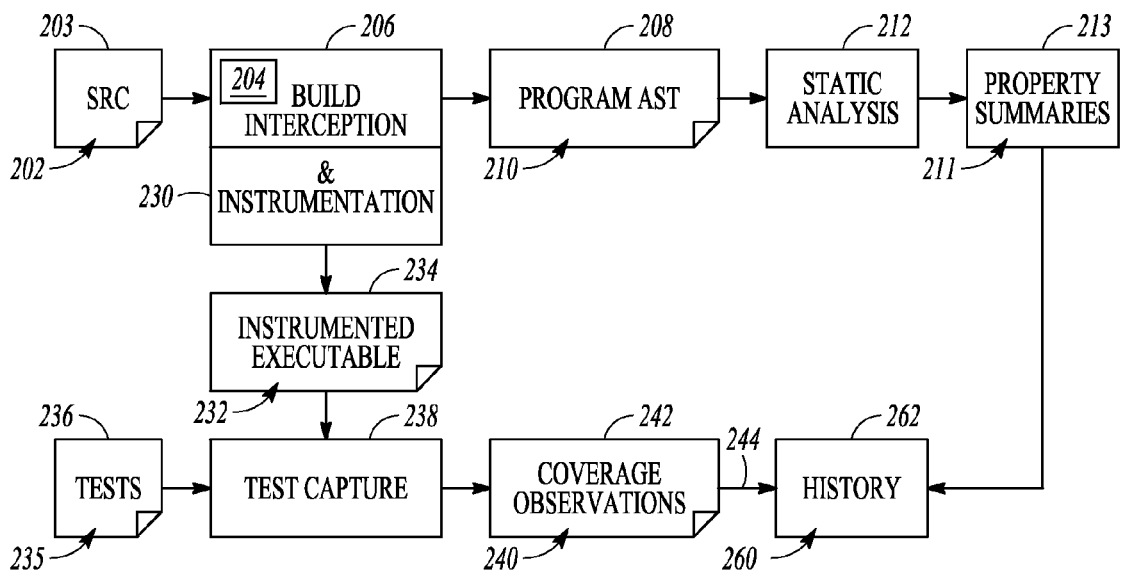
FIGS. 3A-3B are an illustrative block diagrams of a baseline run system (FIG. 3A) to implement baseline runs and a partial run system (FIG. 3B) to implement partial runs in accordance with some embodiments.
Figure 3B:
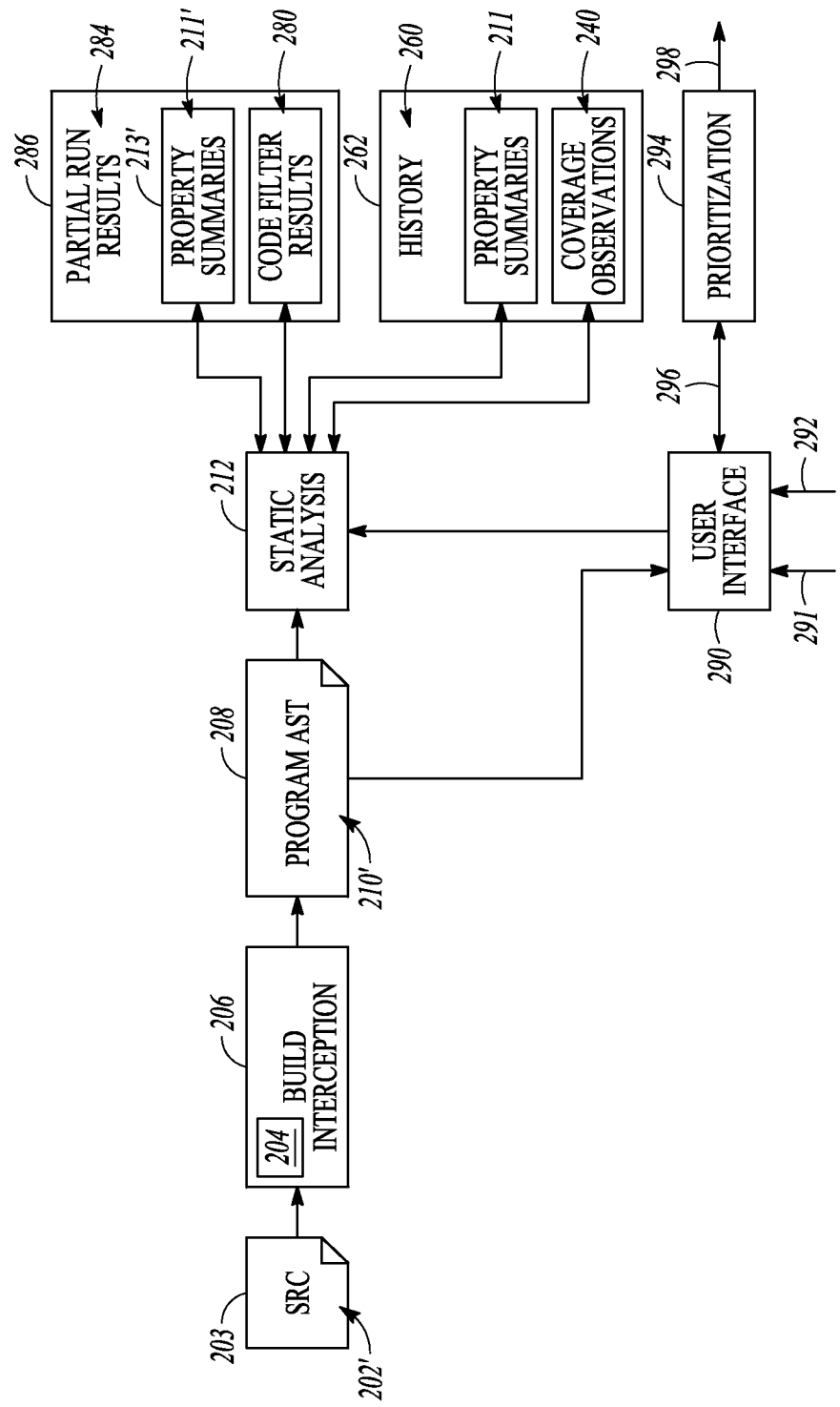

FIGS. 3A-3B are an illustrative block diagrams of a baseline run system (FIG. 3A) to implement baseline runs and a partial run system (FIG. 3B) to implement partial runs. As explained above, baseline runs generate test metrics using baseline source code versions (e.g., $Src_0$, $Src_3$). Partial runs use the test metrics to prioritize tests to be applied to subsequent source code versions. (e.g., $Src_1$, $Src_2$, $Src_4$). It will be appreciated that the baseline system and the partial run system are alike in many respects, and that the same computer system resources can be configured to implement both systems, for example.

Baseline Run System

Referring to FIG. 3A, during a baseline run, a baseline software version (e.g., $Src_0$ or $Src_3$) 202 is stored in a storage device 203. A build module 204 implements a build process that identifies and accesses source code files associated with the software code 202 to be tested. It will be appreciated that the source code 202 may comprise source code files stored in disparate locations and that often a build program is used to configure a computer to locate and identify the files so that they can be tested. More particularly, in some embodiments, a build program such as a 'make' utility automatically builds executable programs and libraries from source code by reading files sometimes called 'makefiles' which specify how to derive the target program. A build interception module 206 configures a computer to intercept the source code files through the build module 204 and captures the identified source code 202 to be tested in a storage device 208. In some embodiments, the code-under-test is transformed for representation in an abstract syntax tree (AST) structure 210 in which many specifics of formatting and identifiers are removed from the source code 202, and the remaining code is organized in a tree structure suitable for automated static analysis of the code.

An instrumentation module 230 configures a computer to compile and instrument the source code 202 that is intercepted by the build intercept module 206 and provides the instrumented executable code 232 for storage in a storage device 234. Dynamic (runtime) test code 235 is stored in a storage device 236. A test capture module 238 configures a computer to run the instrumented executable code 232 and to run the test code 235 to perform runtime tests on the instrumented code 232 and to observe runtime behavior of the instrumented code 232, and to provide runtime observations 240 for storage in a storage device 242.

In some embodiments, the capture module 238 configures the computer to produce runtime observations 240 that are captured in a computer readable storage device 242 and that provide coverage information such as the functions and/or files that are covered by different tests. In other words, the runtime observations indicate for each dynamic test, each function that is executed in the course of running the test. Also, for each test, the runtime observations indicate each file that is invoked in the course of running the test.

In addition, the capture module 238 configures the computer to produce runtime observations that provide non-structural information about the dynamic tests that are run such as, the duration of the test, the time when the test was run and whether or not the test failed.

A static analysis module 212 configures a computer to implement a static analysis software tool to perform static analysis of the source code 202 represented by the AST structure 210 stored in the storage device 208. Performing static analysis may involve configuring a computer to run a variety of checkers on the source code to produce a corresponding variety of static analysis results. A checker is a program that analyzes the static code for some specific property or characteristic. In some embodiments, the static analysis module 212 produces first static analysis results indicated by arrow 220 that can identify selected properties of the source-code-under-test 202, which is represented by the AST structure 210.

The static analysis module 212 configures the computer to run checkers that produce information indicative of properties of the functions within the code 202. Table A provides an illustrative example of property evaluations performed by two illustrative checkers and alternative possible checker determinations or outcomes of the evaluations in accordance with some embodiments.

TABLE A

| Checker Property Evaluation | Alternative Possible Property Determinations |
| --- | --- |
| Can this function return a null pointer value? | {yes, no, maybe} |
| Does this function dereference its argument? | {always, never, sometimes} |

It will be appreciated that the properties of a function can provide indicia of potential defects and/or vulnerabilities associated with the function. Table B sets forth some examples of potential inferences that can be drawn from certain properties of functions contained within a computer program, as to potential computer program code defects. These inferences may provide indicia of code defects and/or code vulnerabilities, for example.

TABLE B

| Property | Implication (for code calling the function) |
| --- | --- |
| null pointer value? - yes | If a function definitely can return a null pointer value, the code calling the function must handle that possibility |
| null pointer value? - no | If a function definitely CAN NOT return a null pointer value, the code calling the function does NOT need to handle that possibility |
| null pointer value? - maybe | If a function may return a null pointer value, the code calling the function must handle that possibility |
| dereference its argument? - always | If a function dereferences its argument, the code calling the function must ensure that the argument's value cannot be null |
| dereference its argument? - never | If a function dereferences its argument, the code calling the function does NOT need to ensure that the argument's value cannot be null |
| dereference its argument? - sometimes | If a function dereferences its argument, the code calling the function must ensure that the argument's value cannot be null |

In accordance with some embodiments, the static analysis module 212 produces property summaries 211 that are saved in a computer readable storage device 213 for individual functions within the code 212 and that are indicative of the properties associated with the functions. For example, suppose that checkers of the static analysis module determine that some given function within the code has the following properties: it cannot return a null pointer value; and it sometimes dereferences its argument. The properties of that given function are summarized in the following Table C, which is stored in a computer readable storage device.

TABLE C

| Determined Properties |
| --- |
| Can this function return a null pointer value? {yes} |
| Does this function dereference its argument? {sometimes} |

In some embodiments, the static analysis module 212 configures the computer to run checkers that produce additional 'change impact' property summaries 211 that are stored in the computer readable storage device 213 and that are useful to determine whether a change in a function in one part of the code 202 has an impact upon another function elsewhere in the code. For example, the code may include a function-call hierarchy in which a function in the hierarchy makes a call to another function in the hierarchy. A caller/ callee relationship between calling and called functions can result in a dependency relationship between the functions, such that a property of the calling function may be dependent upon a property of the called function. Thus, a change in a property of the called function may have an impact upon a property of the calling function. In other words, a property of a calling function can be impacted (i.e. changed) as a result of a change in the code of a called function even if there is no actual change to the code of the calling function.

Checkers of the static analysis module 212 in accordance with some embodiments configure the computer to produce property summaries 211 that not only are indicative of the current properties of a given function, but also are indicative of the impact of code of a function that the given function is dependent upon, upon the properties of the given function. A comparison of property summaries corresponding to the same given function in different versions of some source-code-under-test, therefore, can be used to identify an impact upon the given function resulting from a change in a function that the given function is dependent upon even if there is no change in the actual code of the given function. Details of the production and use of the summaries are provided in commonly owned pending patent application Ser. No. 14/037,576, entitled, Static Analysis of Computer Code to Determine Impact of Change to a Code Component Upon a Dependent Code Component, filed on even date herewith, which is expressly incorporated herein in its entirety by this reference.

The runtime observations 240 that are generated through dynamic analysis during a baseline run and the property summaries and the additional change impact property summaries 211 that are generated through static analysis during the baseline constitute test metrics that contribute to a history 260 that is stored in a computer readable storage device 262. The history 260 is used to weight tests during subsequent partial runs. The runtime observations provide coverage information for the dynamic tests. The property summaries and additional change impact property summaries provide information that is useful to evaluate the impact of code changes from one code version to the next during a code development effort.

Partial Run System

Referring to FIG. 3B, during a partial run, a modified software version (e.g., Src$_1$, Src$_2$ or Src$_4$) 202' is stored in the storage device 203. The build module 204 implements the build process that identifies and accesses source code files associated with the software code 202' to be tested. As explained above with reference to the baseline run, it will be appreciated that the source code 202' may comprise source code files stored in disparate locations and a build program automatically builds executable programs and libraries from source code. The build interception module 206 configures a computer to intercept the source code files through the build module 204 and captures the identified source code 202' to be tested in a storage device 208. As explained above, in some embodiments, the code-under-test is transformed for representation in an abstract syntax tree (AST) structure 210' in which the code is organized in a tree structure suitable for automated static analysis of the code.

The static analysis module 212 configures the computer to implement a static analysis software tool to perform static analysis of the source code 202' represented by the AST structure 210' stored in the storage device 208. The static analysis tool implements code filters (not shown), described more fully below, that are used to analyze the code 202' (represented by the AST 210'). In some embodiments, the code filters are used to produce code filter results 280 that identify portions of the code determined to be accorded some special weight for test prioritization purposes, for example. In some embodiments, the identified portions of the code may comprise code of a given function or code of a given file, for example. The code filter results 280 are stored in computer readable storage device 282.

The static analysis module 212 configures the computer to run the checkers that produce information indicative of properties of the functions within the code 202'. The property information produced during a partial run is of the same kind that is produced during a baseline run. That is, the static analysis module 212 produces property summaries 211' for the code 202' that are saved in a computer readable storage device 213' for individual functions within the code 210'. The property summaries are indicative are indicative of the properties associated with the functions. As explained above, static analysis module checkers can configure the computer to produce property summaries 211' that are indicative of the current properties of a given function, but also can produce property summaries that are indicative of the impact of code of a function that the given function is dependent upon, upon the properties of the given function.

The runtime observations 240 that are generated through dynamic analysis during a baseline run and the property summaries 211' that are generated through static analysis during the partial run contribute to a partial run results record 284 that is stored in a computer readable storage device 286.

A user interface (UI) module 290 configures a computer system to receive user input, indicated by arrow 291, to define the code filters and to receive user input 292, indicated by arrow 291, to indicate test weighting and prioritization criteria. In some embodiments, the weighting criteria include rules for scoring tests, and rules for prioritization criteria include rules for prioritizing tests as a function of scores produced using the weighting criteria. The UI module 290 also obtains information concerning the code-under-test 210' as indicated by arrow 293. In some embodiments, a user may specify rules to prioritize tests in accordance with weights or scores attributed to the tests in response to a comparison of information in the baseline history 260 with information in the partial run results 284.

Based upon user input, a test prioritization module 294 in concert with the static analysis module prioritizes tests as a function of information in the history 260 and information in the partial run results 284. User input 291 to the UI module 290 is used to define the code filters used during a partial run. The user-inputted code filter information 291 is communicated, in turn, by the UI module 290 to the static analysis module 212 as indicated by arrow 295 to instruct the static analysis module 212 as to the code filters to implement. The user specified test prioritization criteria, such as rules, are communicated by the UI module 290 to the test prioritization module 294 as indicated by arrow 296. The test prioritization module 294 may compare property summaries 211 produced during a baseline run with property summaries 211' produced during a partial run to determine what code portions have changed or have been impacted by code changes and also to determine scores of tests applicable to the changed and/or impacted code portions based upon the user-provided rules or weighting criteria. It will be appreciated that comparison of property summaries is optional and depends upon user-supplied input. The static analysis module 212 evaluates the code filter results and determines scores for tests applicable to the filtered portions. The scores accorded to different tests are determined based upon the user-provided weighting criteria or rules. The test prioritization module 294 produces an indication, represented by line 298, of prioritization among tests as a function of the scores accorded to the different tests. The scores accorded to different tests are determined based upon the user-provided rules for prioritizing tests as a function of scores produced using the weighting criteria or rules.

Filter Example

Figures 4, 5:
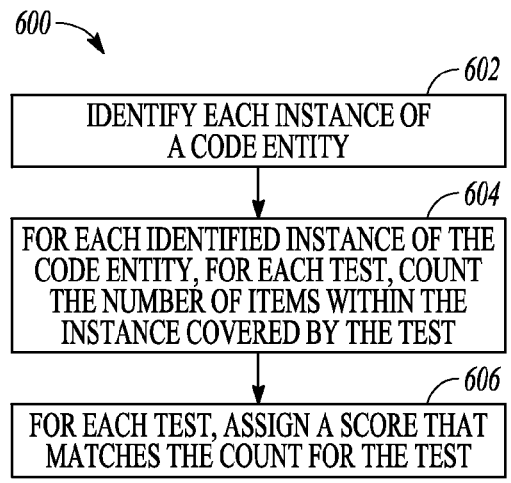
FIG. 4 is an illustrative flow diagram representing a code filter process in accordance with some embodiments.
FIG. 5 is an illustrative drawing that shows example computer program code that is stored in a non-transitory computer readable storage device and that is executed during a baseline run in accordance with some embodiments.

FIG. 4 is an illustrative flow diagram representing a code filter process 600 in accordance with some embodiments. Module 602 configures a computer system to identify each instance of a code entity. Module 604 configures the computer to determine, for each identified code entity, for each test, a count of a number of items within the instance that are covered by the test. Module 606 configures the computer to assign a score for each test that matches the count for the test.

Different code filters define different code entities and different items. The code entities and items can be user-defined. Thus, the code filter process 600 applies to different kinds of entities and to different kinds of items.

In a first filter, for example, a code entity is defined as the entire program code, and the items are defined as the functions within the program code. Thus, the first filter configures the computer to score each test according to the number of functions covered by the test. Example scoring according to this first example filter is shown below in Table G.

In a second filter, for example, a code entity is defined as the entire program code, and the items are defined as the functions within the program code that have changed since the baseline run. Thus, the second filter configures the computer to score each test according to the number of functions having property changes that are covered by the test. Example scoring according to this first example filter is shown below in Table H.

In a third filter, for example, a code entity is defined as a prescribed application programming interface, and the items are defined as functions that call the prescribed application programming interface. The third filter configures the computer to parse the code to identify functions that call the interface and to score each test according to the number of functions that both call the interface and that are covered by the test.

In a fourth filter, for example, a code entity is defined as files that contain particular text label (e.g., 'high security'), and the items are functions within such files. The fourth filter configures the computer to parse the code to identify files that contain the specified text label and to score each test according to the number of functions that are both within an identified file and that are covered by the test.

Code Example

FIG. 5 is an illustrative drawing that shows example computer program code that is stored in a non-transitory computer readable storage device and that is executed during a baseline run in accordance with some embodiments. Referring to FIG. 3A, assume, for example, that the code 202 comprises the illustrative baseline run code (e.g., $Src_O$) of FIG. 5. The program includes four functions identified as main, f1, f2 and f3. Function f1 inputs a parameter value and returns it, unchanged. Functions f2 and f3 each input a parameter value, increment the parameter value by one, and return the incremented value. Modules 206 and 204 intercept and build the source code. Module 230 instruments the code and compiles it to produce an instrumented executable code version 232.

Assume, for example, that "demo" is the name of the executable into which the baseline program is compiled. In this example, the program, demo, is dynamically run three times with three different input arguments, argument 1, argument 2 and argument 3. These three dynamic runs shall be referred to as "demo1", "demo2" and "demo3".

Module 238 configures a computer system to dynamically run each of demo1, demo2 and demo3 and to run test code 235 during each run to perform runtime tests on the code. The module 238 also configures the computer to capture runtime observations 240 that indicate which functions from the illustrative program 202 are executed during each run. Assume, for example, that in this example, when demo1 is run (with input argument 1), the runtime observations 240 indicate that demo program executes functions f2 and f3. When demo2 is run (with input argument 2), the runtime observations 240 indicate that program executes functions f1 and f3. When demo3 is run (with input argument 3), the runtime observations 240 indicate that program executes only function f3. Thus, the test coverage for the demo program code is different for each run of the demo code. That is, the provision of different inputs to the demo program code during the different dynamic test runs results in different code execution paths during the different run, which means that different combinations of functions are executed during the different runs. Table D illustrates the mapping of test runs to functions covered by the test runs.

TABLE D

| Test Run | f1 covered | f2 covered | f3 covered | main covered |
| --- | --- | --- | --- | --- |
| demo1 | — | X | X | X |
| demo2 | X | — | X | X |
| demo3 | — | — | X | X |

It is noted that in the simple example code of FIG. 5, the functions that are covered by each test can be ascertained easily by inspecting the code. However, persons skilled in the art will readily appreciate that determining which functions execute in response to different inputs cannot be determined so easily. For that reason, numerous tests may be devised to ensure thorough code coverage.

Moreover, it will be appreciated that coverage also can be observed for files. In other words, the test capture module 238 can be configured to produce coverage observations 240 that indicate which files are accessed in the course of each of the baseline dynamic runs involving demo1, demo2 and demo3. However, in this example, only one source code file is accessed.

Referring again to FIG. 3A, in the course of the baseline run, an AST 210 is produced that represents the program code of FIG. 5. Assume that in this example, the static analysis module 212 configures the computer to perform a property check on each function of the example program code to evaluate the function with respect to the property, "Can the function return 0?" Assume, for example, that the property checks for the example program code of FIG. 5 produce the results indicted in the following Table E. The results in Table E are stored in as property summaries in storage device 213.

TABLE E

| Function | Returned Property for "Can the function return 0?" |
| --- | --- |
| main | no |
| f1 | no |

TABLE E-continued

| Function | Returned Property for "Can the function return 0?" |
|---|---|
| f2 | no |
| f3 | no |

Now assume for example that the program code has been changed.

FIG. 6 is an illustrative drawing that shows example changed computer program code that that is stored in a non-transitory computer readable storage device and that is evaluated during a partial run in accordance with some embodiments. Referring to FIG. 3B, assume, for example, that the code 202' comprises the illustrative partial run code (e.g., $Src_1$) of FIG. 6. Changes within the example code are bracketed by the comments "//CHANGE START" and "//CHANGE END". The code changes alter the behavior of functions f1 and f3 in that each of these functions now returns 0 if *x is a null pointer. It will be appreciated that the changes are measured as between the baseline code, shown in FIG. 5, and a current version of the code, shown in FIG. 6.

Referring to FIG. 3B, in the course of the partial run, an AST 210' is produced that represents the program code 202' of FIG. 6. Assume that in this example, the static analysis module 212 configures the computer to perform a property check on each function of the example changed program code to evaluate the function with respect to the property, "Can the function return 0?" Assume, for example, that the property checks for the example changed program code of FIG. 6 produce the results indicted in the following Table F. The results in Table F are stored in as property summaries in storage device 213'.

TABLE F

| Function | Returned Property for "Can the function return 0?" |
|---|---|
| main | no |
| f1 | maybe |
| f2 | no |
| f3 | maybe |

Still referring to FIG. 3B, assume, for example, that a user provides to the UI module 290, input indicated by line 291 to define a code filter and input indicated by line 292 to define prioritization rules, Rule 1 and Rule 2. Rule 1 prioritizes tests base upon coverage. Rule 2 prioritizes tests based upon changes between the baseline run and the partial run. Assume also, that the user defines respective first and second code filters to weight the tests as applied to the changed code for use with Rule 1 and Rule 2, respectively. The UI module 290, in turn, communicates corresponding code filter information to the static analysis module 212 and communicates Rule 1 and Rule 2 to the prioritization module 294.

The static analysis module 212 configures the computer to examine the changed code to determine which functions are present in that code. Consider, for example, that changes could have been made that removed one or more of the functions, which could affect the weighting applied to the tests. In this example, the static analysis module 212 applies the first filter, which produces filter results 280 that weights tests demo1, demo2 and demo3 according to the number of functions in the changed code that they cover as indicated in Table G.

TABLE G

| (Filter 1 scores) | |
|---|---|
| Test | Rule 1 Score |
| demo1 | 3 |
| demo2 | 3 |
| demo3 | 2 |

Assume, for example, that Rule 1 prioritizes the tests such that the greater the coverage score, the higher the priority assigned to the test. The prioritization module 294, therefore, configures the computer to apply Rule 1 which prioritizes the tests in order demo1, followed by demo2, followed by demo3. It will be understood that the ordering as between demo1 and demo2 is arbitrary in this example since the first filter determined that they have the same weights.

Now, assume, for example, the static analysis module 212 applies the second filter, which produces filter results 280 that weights tests demo1, demo2 and demo3 according to the number of functions having property changes in the changed code. The static analysis module configures the computer to access the property summary information 211 and 211' represented in Tables E and F, and to apply the second filter to score the tests as indicated in Table H.

TABLE H

| (Filter 2 scores) | |
|---|---|
| Test | Rule 2 Score |
| demo1 | 1 |
| demo2 | 2 |
| demo3 | 1 |

Assume, for example, that Rule 2 prioritizes the tests such that the greater the number of property-changed functions covered, the higher the priority assigned to the test. The prioritization module 294, therefore, configures the computer to apply Rule 2 which prioritizes the tests in order demo2, followed by demo1, followed by demo3. It will be understood that the ordering as between demo1 and demo3 is arbitrary in this example since the first filter determined that they have the same weights.

Given the prioritization results represented by Tables G and H, a user would have an option to prioritize tests either based on Rule 1, the number of covered functions, which would execute the tests in a priority order, "demo 1, demo 2, demo 3" or based on Rule 2, the number of covered impacted functions (since test execution, which would execute the tests in a priority order, "demo 2, demo 1, demo 3".

Hardware Environment

Figure 7:
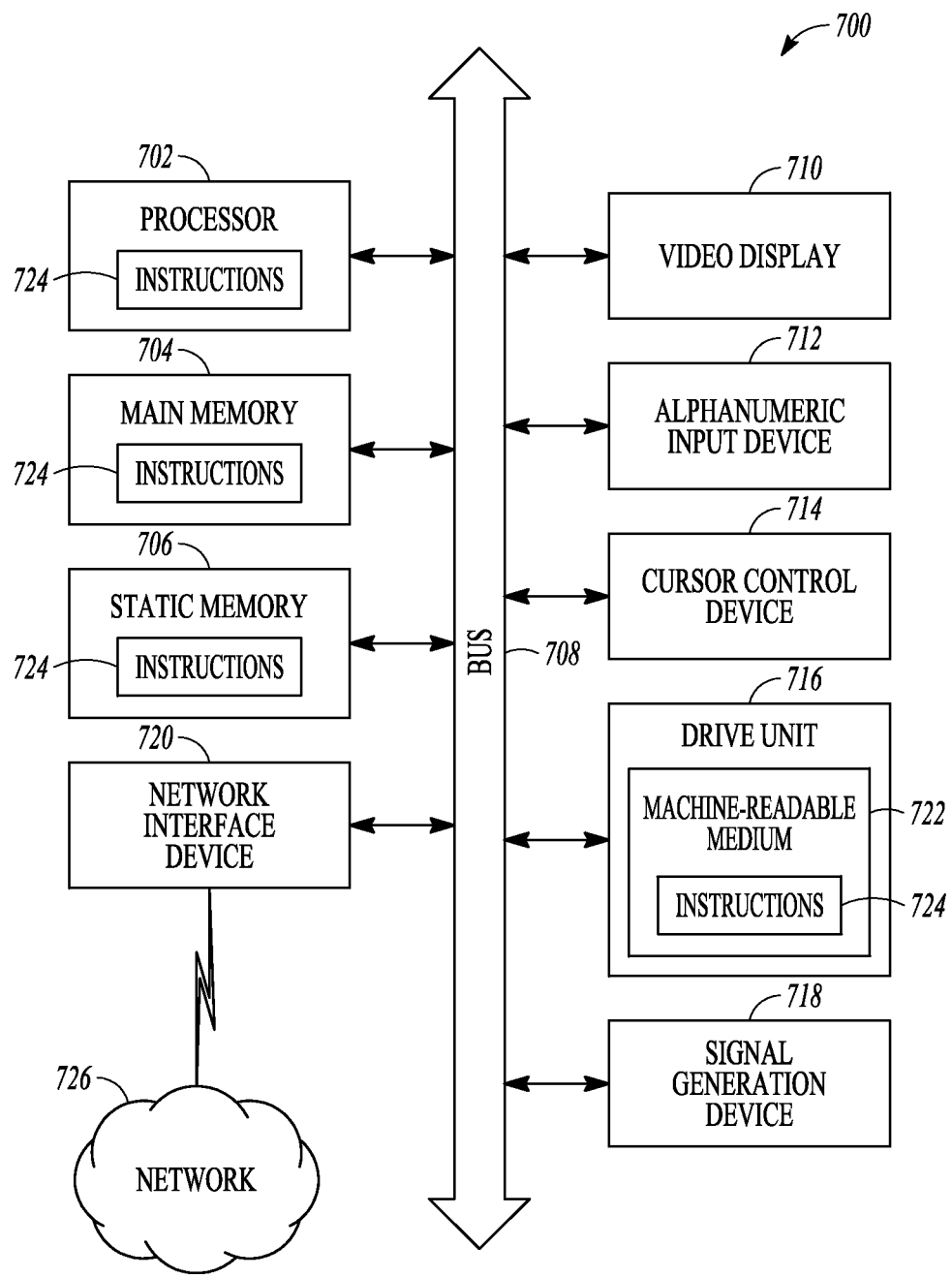
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. The computer system 700 can comprise, for example, can be configured to implement a static analysis tool including derivers, for example. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., liquid crystal display (LCD), organic light emitting diode (OLED) display, touch screen, or a cathode ray tube (CRT)) that can be used to display the results of the change impact analysis?, for example. The computer system 700 also includes an alphanumeric input device 712 (e.g., a keyboard, a physical keyboard, a virtual keyboard using software), a cursor control device or input sensor 714 (e.g., a mouse, a trackpad, a trackball, a sensor or reader, a machine readable information reader, bar code reader), a disk drive unit 716, a signal generation device 718 (e.g., a speaker) and a network interface device or transceiver 720.

The disk drive unit 716 includes a non-transitory machine-readable storage device medium 722 on which is stored one or more sets of instructions (e.g., software 724) embodying any one or more of the methodologies or functions described herein, such as the processes of FIGS. 1 and 4. The software 724 may also reside, completely or at least partially, within the main memory 704 and/or within the processor 702 during execution thereof by the computer system 700, the main memory 704 and the processor 702 also constituting non-transitory machine-readable storage device media. The non-transitory machine-readable storage device medium 722 also can store an integrated circuit design and waveform structures.

The 724 may further be transmitted or received over a network 726 via the network interface device 720.

While the machine-readable medium 722 is shown in an example embodiment to be a single medium, the term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the present disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present disclosure has been described in connection with some embodiments, it is not intended to be limited to the specific form set forth herein. One skilled in the art would recognize that various features of the described embodiments may be combined in accordance with the present disclosure. Moreover, it will be appreciated that various modifications and alterations may be made by those skilled in the art without departing from the spirit and scope of the present disclosure.

In addition, in the foregoing detailed description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the detailed description, with each claim standing on its own as a separate embodiment.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to prioritized testing of computer program code, the method, comprising:
    obtaining a user input, the user input indicating test weighting criteria and test prioritization criteria;
    performing a baseline run, wherein performing the baseline run comprises:
        performing at least one dynamic test on a baseline source code to produce runtime observations,
        performing a static analysis on the baseline source code to produce a first property summary, the first property summary identifying at least one property associated with a function within the baseline source code, and
        storing, in a non-transitory storage device, a history, the history comprising the runtime observations and the first property summary;
    after performing the baseline run, performing a partial run, wherein performing the partial run comprises:
        performing a static analysis on a modified source code to produce a second property summary, the second property summary identifying, in the modified source code, the at least one property associated with the function identified within the baseline source code and identifying, in the modified source code, at least one property associated with the function identified within the baseline source code wherein the property has changed relative to the baseline source code version, the modified source code being a modified version of the baseline source code, and
    wherein the function is a first function, and wherein the first property summary or the second property summary indicates an impact of a change in the first function on a second function, wherein the second function is unchanged from the baseline source code to the modified source code;
    storing a partial run results record, the partial run results record comprising the second property summary;
    prioritizing a plurality of tests based at least in part on the user input, information from the history, and information from the partial run results record; and
    executing the plurality of tests according to the priority.

2. The method of claim 1, wherein prioritizing the plurality of tests includes selecting a subset of tests from the plurality of tests that, the subset of tests representing tests are to be run.

3. The method of claim 1, wherein the runtime observations identify one or more of: the function within the baseline source code, a file covered by the at least one dynamic test, a duration of the at least one dynamic test, a time when the at least one dynamic test was run, or an indication of whether the at least one dynamic test failed.

4. The method of claim 1, wherein performing a static analysis comprises running a checker.

5. The method of claim 1, wherein the first property summary or the second property summary indicates a potential defect or vulnerability associated with the function within the baseline source code.

6. The method of claim 1, wherein the test weighting criteria comprise a rule for scoring the plurality of tests, and the test prioritization criteria comprise a rule for prioritizing at least some of the plurality of tests as a function of scores produced using the test weighting criteria.

7. The method of claim 1, wherein performing the static analysis on the modified source code to produce the second property summary comprises implementing a code filter.

8. The method of claim 1, wherein prioritizing the plurality of tests based at least in part on (a) the user input, (b) the information from the history, and (c) the information from the partial run results record comprises:
    comparing the first property summary to the second property summary to (i) identify changes to or operational differences of the modified source code relative to the baseline source code, and (ii) determine scores of the plurality of tests based on the user input.

9. The method of claim 1, further comprising:
    producing an indication of the prioritization of the plurality of tests.

10. An article of manufacture that includes a non-transitory computer readable storage device that includes code that can be used to configure a computer system to perform a process that includes:
    obtaining a user input, the user input indicating test weighting criteria and test prioritization criteria;
    performing a baseline run, wherein performing the baseline run comprises:
        performing at least one dynamic test on a baseline source code to produce runtime observations,
        performing a static analysis on the baseline source code to produce a first property summary, the first property summary identifying at least one property associated with a function within the baseline source code, and
        storing, in a non-transitory storage device, a history, the history comprising the runtime observations and the first property summary;
    after performing the baseline run, performing a partial run, wherein performing the partial run comprises:
        performing a static analysis on a modified source code to produce a second property summary, the second property summary identifying, in the modified source code, the at least one property associated with the function identified within the baseline source code and identifying, in the modified source code, at least one property associated with the function identified within the baseline source code wherein the property has changed relative to the baseline source code version, the modified source code being a modified version of the baseline source code, and wherein the function is a first function, and wherein the first property summary or the second property summary indicates an impact of a change in the first function on a second function, wherein the second function is unchanged from the baseline source code to the modified source code;

storing a partial run results record, the partial run results record comprising the second property summary;

prioritizing a plurality of tests based at least in part on the user input, information from the history, and information from the partial run results record; and executing the plurality of tests according to the priority.

11. A system comprising:

a first computer system, in communication with a non-transitory storage device, configured to, perform a baseline run, wherein performing the baseline run comprises:

performing at least one dynamic test on a baseline source code to produce runtime observations, perform a static analysis on the baseline source code to produce a first property summary, the first property summary identifying at least one property associated with a function within the baseline source code, and store, in a non-transitory storage device, a history, the history comprising the runtime observations and the first property summary;

a second computer system, in communication with a non-transitory storage device, configured to, obtain user input, the user input indicating test weighting criteria and test prioritization criteria;

after performing the baseline run, perform a partial run, wherein performing the partial run comprises:

perform a static analysis on a modified source code to produce a second property summary, the second property summary identifying, in the modified source code, the at least one property associated with the function identified within the baseline source code and identifying, in the modified source code, at least one property associated with the function identified within the baseline source code wherein the property has changed relative to the baseline code version, the modified source code being a modified version of the baseline source code, and wherein the function is a first function, and wherein the first property summary or the second property summary indicates an impact of a change in the first function on a second function, wherein the second function is unchanged from the baseline source code to the modified source code;

store a partial run results record, the partial run results record comprising the second property summary;

prioritize a plurality of tests based at least in part on the user input, information from the history, and information from the partial run results record; and execute the plurality of tests according to the priority.

12. The system of claim 11, wherein the first and second computer systems share computer system resources.

13. A method to prioritized testing of computer program code, the method, comprising:

receiving baseline source code;

receiving user input of test weighting and test prioritization criteria;

performing a baseline run comprising: at least one dynamic test on the baseline source code, performing static analysis on the baseline source code, resulting in a property summary and runtime observations, and storing the result of the baseline run in a memory;

receiving a modified source code, the modified source code being a modified version of the baseline source code;

performing a partial run comprising: performing static analysis on the modified source code, to produce a second property summary identifying at least one property in the modified source code associated with a function identified in the baseline source code that is changed relative to the baseline source code version, wherein the first property summary or the second property summary indicates an impact of the change in the function on a second function that is unchanged between the baseline source code and the modified source code;

storing results of the partial run, comprising the second property summary; and prioritizing a plurality of tests based at least in part on the user input, the stored results of the baseline run, and the results of the partial run.

14. The method of claim 13, wherein the user input comprises:

the test weighting criteria comprising a rule for scoring the plurality of tests, and the test prioritization criteria comprising a rule for prioritizing at least some of the plurality of tests based on the test weighting criteria.

15. The method of claim 13, wherein performing the static analysis on the modified source code to produce the second property summary comprises implementing a code filter.

16. The method of claim 13, wherein prioritizing the plurality of tests comprises:

comparing the first property summary to the second property summary to identify changes to or operational differences of the modified source code relative to the baseline source code, and determine scores of the plurality of tests based on the user input.

17. The method of claim 13, further comprising:

producing an indication of the prioritization of the plurality of tests.

18. The method of claim 13, wherein prioritizing the plurality of tests includes selecting a subset of tests from the plurality of tests that, the subset of tests representing the tests that are to be run.

19. The method of claim 13, wherein the runtime observations identify one or more of: the function within the baseline source code, a file covered by the at least one dynamic test, a duration of the at least one dynamic test, a time when the at least one dynamic test was run, or an indication of whether the at least one dynamic test failed.

20. The method of claim 13, wherein performing a static analysis comprises running a checker.

21. The method of claim 13, wherein the first property summary or the second property summary indicates a potential defect or vulnerability associated with the function within the baseline source code.

* * * * *